(12) United States Patent
Bhargava et al.

(10) Patent No.: US 11,176,169 B2
(45) Date of Patent: Nov. 16, 2021

(54) RECOMMENDING VISUAL AND EXECUTION TEMPLATES TO ENABLE AUTOMATION OF CONTROL AND DATA EXPLORATION ACROSS SYSTEMS

(71) Applicant: CLEARTRAIL TECHNOLOGIES PRIVATE LIMITED, New Delhi (IN)

(72) Inventors: Anand Bhargava, New Delhi (IN); Sapnesh Agrawal, New Delhi (IN); Abhishek Gupta, New Delhi (IN); Vishal Bhandari, New Delhi (IN)

(73) Assignee: CLEARTRAIL TECHNOLOGIES PRIVATE LIMITED, New Delhi (IN)

( * ) Notice: Subject to any disclaimer, the term of this patent is extended or adjusted under 35 U.S.C. 154(b) by 0 days.

(21) Appl. No.: 16/960,650

(22) PCT Filed: Jan. 9, 2019

(86) PCT No.: PCT/IB2019/050157
§ 371 (c)(1),
(2) Date: Jul. 8, 2020

(87) PCT Pub. No.: WO2019/138336
PCT Pub. Date: Jul. 18, 2019

(65) Prior Publication Data
US 2020/0363775 A1    Nov. 19, 2020

(30) Foreign Application Priority Data

Jan. 9, 2018  (IN) .............................. 201711031963

(51) Int. Cl.
*G05B 19/18* (2006.01)
*G06F 16/27* (2019.01)
(Continued)

(52) U.S. Cl.
CPC .............. *G06F 16/27* (2019.01); *G05B 11/32* (2013.01); *G05B 15/02* (2013.01); *G06F 9/451* (2018.02);
(Continued)

(58) Field of Classification Search
CPC ... H04L 41/50; G06F 16/9535; G06F 16/972; G06F 16/2454; G06F 16/2425;
(Continued)

(56) References Cited

U.S. PATENT DOCUMENTS 6,807,539 B2   10/2004  Miller et al.
7,194,678 B1 *  3/2007  Koike ................... G06F 16/972
                                                         715/234

(Continued)

FOREIGN PATENT DOCUMENTS

EP         1277138 A1    1/2003

*Primary Examiner* — Tuan A Vu
(74) *Attorney, Agent, or Firm* — Maschoff Brennan

(57) ABSTRACT

The present disclosure relates to platform configured to recommend Visual and Execution templates to automate exploration across one or more disparate systems. The platform is configured for receiving data from a target system. Further, the platform is configured to identifying a set of best fit templates, from a set of templates. In one embodiment, the set of templates may comprise one or more templates created by the user, one or more templates published by other users associated with the user, and one or more system generated templates. The platform is configured to analyze the set of templates based on the type of data received from the target system and a set of predefined rules to identify a subset of best fit templates (discovered Templates) from the set of templates. Furthermore, the platform is configured to execute the subset of best fit templates for performing one or more data processing operations.

20 Claims, 5 Drawing Sheets

(51) Int. Cl.
  *G06F 9/451* (2018.01)
  *G05B 11/32* (2006.01)
  *G05B 15/02* (2006.01)
  *G06F 16/242* (2019.01)
  *G06F 21/62* (2013.01)
  *G06F 16/958* (2019.01)
  *H04L 12/24* (2006.01)

(52) U.S. Cl.
  CPC ...... *G06F 16/2425* (2019.01); *G06F 21/6254* (2013.01); *G06F 16/972* (2019.01); *H04L 41/50* (2013.01)

(58) Field of Classification Search
  CPC ...... G06F 21/6254; G06F 16/27; G06F 9/451; G05B 11/32; G05B 15/02
  See application file for complete search history.

(56) References Cited

U.S. PATENT DOCUMENTS

| | | |
|---|---|---|
| 7,644,361 B2 | 1/2010 | Wu et al. |
| 8,191,005 B2 | 5/2012 | Baier et al. |
| 8,615,493 B2 | 12/2013 | Prahlad et al. |
| 2004/0128276 A1 | 7/2004 | Scanlon et al. |
| 2010/0199181 A1 | 8/2010 | Robertson et al. |
| 2013/0262501 A1 | 10/2013 | Kuchmann-Beauger et al. |
| 2014/0282910 A1 | 9/2014 | Palmer et al. |
| 2014/0324469 A1 | 10/2014 | Reiner |
| 2015/0100893 A1 | 4/2015 | Cronin et al. |
| 2015/0186477 A1* | 7/2015 | Nishino ............ G06F 16/9535 707/722 |
| 2015/0212663 A1 | 7/2015 | Papale et al. |
| 2015/0229645 A1* | 8/2015 | Keith ................ H04L 41/50 726/4 |
| 2017/0220633 A1 | 8/2017 | Porath et al. |
| 2018/0032570 A1* | 2/2018 | Miller ............... G06F 16/2425 |
| 2019/0228008 A1* | 7/2019 | Hou ................. G06F 16/2454 |
| 2020/0110902 A1* | 4/2020 | Zakour ............. G06F 21/6254 |

* cited by examiner

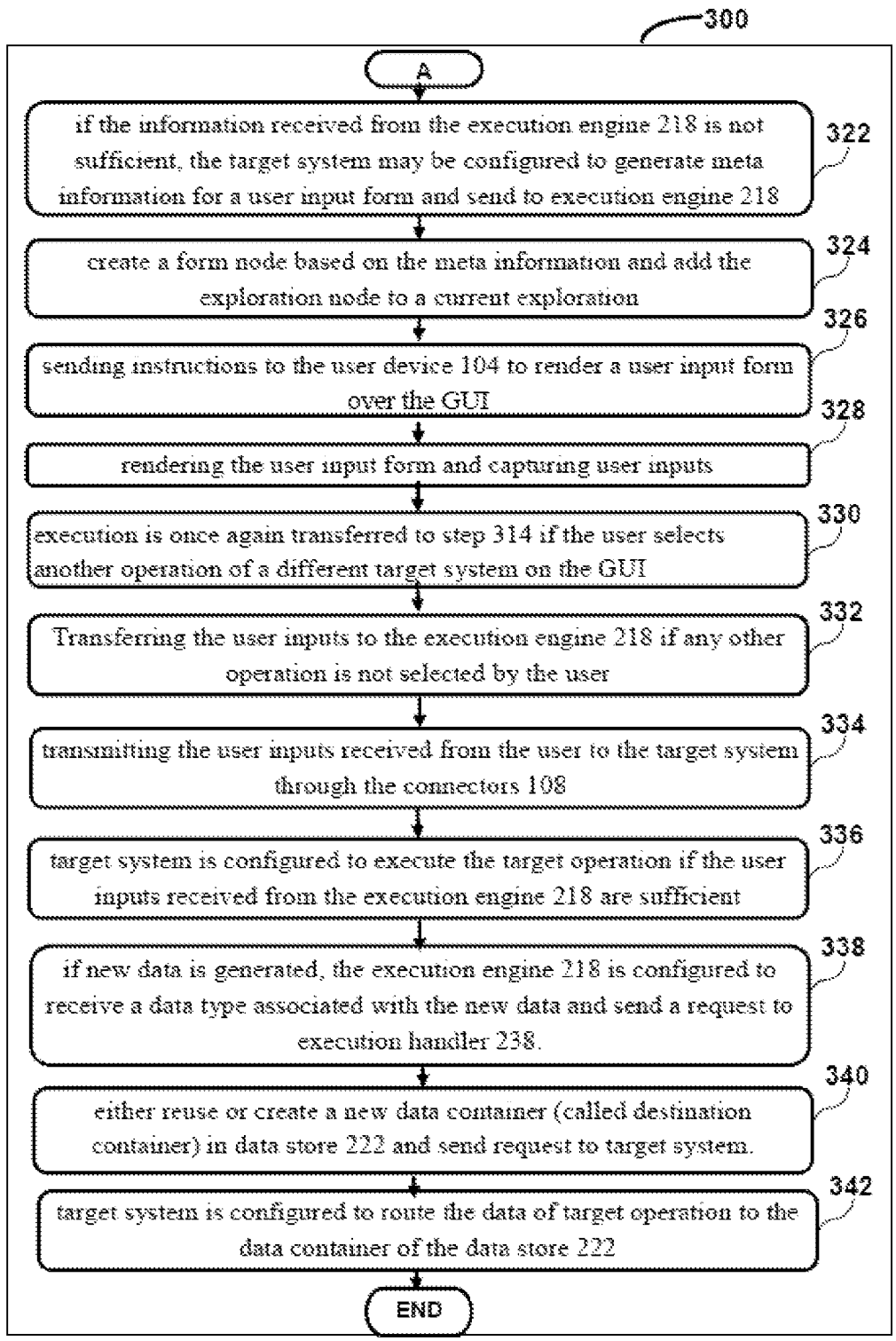
FIGURE 3 (contd.)

RECOMMENDING VISUAL AND EXECUTION TEMPLATES TO ENABLE AUTOMATION OF CONTROL AND DATA EXPLORATION ACROSS SYSTEMS

CROSS-REFERENCE TO RELATED APPLICATIONS AND PRIORITY

This application is the U.S. national stage of International Application No. PCT/IB2019/050157, filed on Jan. 9, 2019, which claims priority from Indian Provisional Patent Application No. 201711031963 filed on Jan. 9, 2018, which are incorporated herein by reference.

TECHNICAL FIELD

The present disclosure in general relates to the field of recommending Visual and Execution Templates to enable automation of control and data exploration across multiple systems.

BACKGROUND

Now a day, with developments in the field of Information Technology (IT), most organizations have multiple disparate systems which contain critical information. These systems largely operate in silos and may have information which is generated by machines or by humans. As a result, users of these systems have to switch applications to view information across these systems, resulting into inefficiency and lower productivity.

For example, in large organizations, there are a number of legacy systems in use, which do not have data analysis and exploration capabilities. Due to this, it becomes difficult to visualize and perform analysis on data in such legacy systems. In addition, it is a tedious and time-consuming job to extract data from databases associated with these legacy systems.

In some scenarios, the data captured by one system cannot be correlated with data captured by another system in the organization. As a result, it becomes very difficult to draw insights and perform analysis on data captured from a set of disconnected systems associated with large organizations.

SUMMARY

This summary is provided to introduce aspects related to platform and methods for recommending Visual and Execution Templates to enable automation of control and data exploration across multiple systems and the aspects are further described below in the detailed description. This summary is not intended to identify essential features of the claimed disclosure nor is it intended for use in determining or limiting the scope of the claimed disclosure.

In one embodiment, a platform for recommending visual and execution templates to enable automation of control and data exploration across multiple systems is disclosed. The platform comprises a memory and a processor coupled to the memory. The processor is configured to execute program instructions, associated with one or more modules, stored in the memory. In one embodiment, the processor may execute program instructions stored in the memory to establish connection with a set of systems. Further, the processor may execute program instructions stored in the memory to render a new exploration or render an existing exploration over a graphical user interface based on user inputs. Further, the processor may execute program instructions stored in the memory to identify a sub-set of systems from the set of systems based on a context information. Further, the processor may execute program instructions stored in the memory to display a set of operations/operation-groups associated with the sub-set of systems based on the context information. Further, the processor may execute program instructions stored in the memory to identify a target system associated with a target operation/operation-group selected by the user. Further, the processor may execute program instructions stored in the memory to transmit the target operation/operation-group execution request to the target system, wherein the target operation/operation-group is associated with one of a read operation, a write operation to control the target system, or a capture user inputs and perform one of read and write operation to control the target system based on the user inputs. Further, the processor may execute program instructions stored in the memory to receive data from the target system, wherein the data is received in response to execution of the operation or operation-group over the target system. Further, the processor may execute program instructions stored in the memory to discover a subset of best fit templates, from a set of saved templates or templates generated in real-time, based on the type of data received from the target system and a set of predefined rules, wherein the subset of best fit templates enable transmitting data to the target system to write back to the target system in order to control the target system and receiving data from target system for data visualization.

In one embodiment, a method for recommending visual and execution templates to enable automation of control and data exploration across multiple systems is disclosed. The method comprises steps to establish connection with a set of external systems and databases. The method further comprises steps to render a new exploration or render an existing exploration over a graphical user interface based on user inputs. The method further comprises steps to identify a sub-set of systems from the set of external systems and databases based on a context information. The method further comprises steps to display a set of operations/operation-groups associated with the sub-set of systems based on the context information. The method further comprises steps to identify a target system associated with a target operation/operation-group selected by the user. The method further comprises steps to transmit the target operation/operation-group execution request to the target system, wherein the target operation/operation-group is associated with one of a read operation, a write operation to control the target system, or capture user inputs and perform one of read and write operation to control the target system based on the captured user inputs. The method further comprises steps to receive data from the target system, wherein the data is received in response to execution of the operation or operation-group over the target system. The method further comprises steps to discover a subset of best fit templates, from a set of saved templates or templates generated in real-time, based on the type of data received from the target system and a set of predefined rules, wherein the subset of best fit templates enables transmitting data to the target system to write back to the target system in order to control the target system and receiving data from target system for data visualization.

In one embodiment, a computer program product having embodied thereon a computer program for recommending visual and execution templates to enable automation of control and data exploration across multiple systems is disclosed. The computer program product comprising a program code to establish connection with a set of external systems and databases. The computer program product comprising a program code to render a new exploration or render an existing exploration over a graphical user interface based on user inputs. The computer program product comprising a program code to identify a sub-set of systems from the set of external systems and databases based on a context information. The computer program product comprising a program code to display a set of operations/operation-groups associated with the sub-set of systems based on the context information. The computer program product comprising a program code to identify a target system associated with a target operation/operation-group selected by the user. The computer program product comprising a program code to transmit the target operation/operation-group execution request to the target system, wherein the target operation/operation-group is associated with one of a read operation, a write operation to control the target system, or capture user inputs and perform one of read and write operation to control the target system based on the captured user inputs. The computer program product comprising a program code to receive data from the target system, wherein the data is received in response to execution of the operation or operation-group over the target system. The computer program product comprising a program code to discover a subset of best fit templates, from a set of saved templates or templates generated in real-time, based on the type of data received from the target system and a set of predefined rules, wherein the subset of best fit templates enables transmitting data to the target system to write back to the target system in order to control the target system and receiving data from target system for data visualization.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

In one embodiment a platform configured for recommending visual and execution templates to enable automation of control and data exploration across multiple systems is illustrated. Initially, the platform may be accessed from a user device. In one embodiment, the platform may be configured to establish connection with a set of systems. The set of systems may be registered over a service registry associated with the platform. Further, the platform may be configured to start a new exploration or render existing/saved exploration over a graphical user interface of the user device based on instructions received from the user. Further, the platform may be configured to identify a sub-set of target systems from the set of target systems based on a visual element selected, by the user, in the exploration or inputs provided by the user. Furthermore, the platform may be configured to display a menu over the graphical user interface based on the visual element selected by the user or inputs provided by the user. The menu may be configured to display a set of operations/operation-groups associated with the sub-set of systems. Further, the platform may be configured to identify a target system associated with the operation/operation-group selected by the user from the menu. Further, the platform may be configured to transmit the operation/operation-group execution request to the target system, wherein the operation/operation-group is associated with one of a read operation, a write operation to control the target system, or capture user inputs and perform read or write operation to control the target system based on the captured user inputs. Further, the platform may be configured to receive data from the target system, wherein the data is received in response to execution of the operation or operation-group over the target system. Further, the platform may be configured to discover a subset of best fit templates, from a set of saved templates or templates generated in real-time, based on the type of data received from the target system and a set of predefined rules, wherein the subset of best fit templates enables transmitting data to the target system to write back to the target system in order to control the target system and receiving data from target system for data visualization and analysis.

While aspects of the described platform for recommending Visual and Execution Templates to enable automation of control and data exploration across multiple systems may be implemented in any number of different computing systems, environments, and/or configurations, the embodiments are described in the context of the following exemplary platform.

Figure 1:
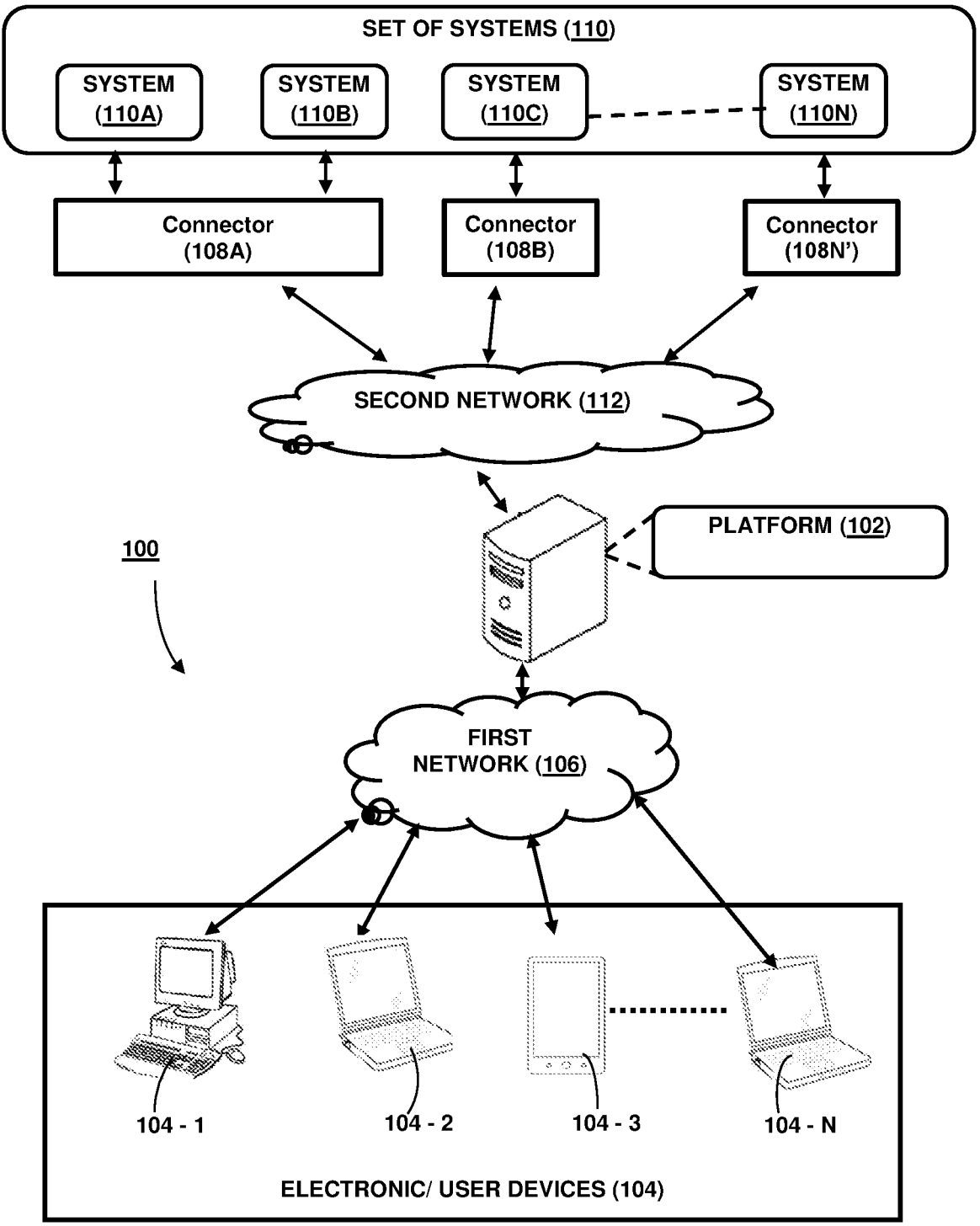
FIG. 1 illustrates a network implementation of a platform for recommending visual and execution templates to enable automation of control and data exploration across multiple systems, in accordance with an embodiment of the present disclosure.

Referring now to FIG. 1, a network implementation 100 of a platform 102 for recommending Visual and Execution Templates to enable automation of control and data exploration across multiple systems is disclosed. Although the present disclosure is explained considering that the platform 102 is implemented on a server, it may be understood that the platform 102 may also be implemented in a variety of computing systems, such as a laptop computer, a desktop computer, a notebook, a workstation, a mainframe computer, a server, a server cluster, distributed servers, a network server, and the like. In one implementation, the platform 102 may be implemented in a cloud-based environment. It will be understood that the platform 102 may be accessed by multiple users through one or more user devices 104-1, 104-2 ... 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the platform 102 through a first network 106. Further, the platform 102 is connected to a set of external systems and databases 110 (may also be referred as systems) through a second network 112. In one embodiment, each system from the set of external systems and databases 110 may be configured to gather, process and maintain data. In one embodiment, each system from the set of external systems and databases 110 may be connected to the platform through connectors 108. Each connector is configured to connect one or more systems to the platform 102. Once the external systems and databases 110 are connected to the platform 102, the user may control these external systems and databases 110 or explore data across the external systems and databases 110. In one embodiment, the connector may be a connector 108 configured to connecting to multiple systems based on the configuration of the connector 108.

In one implementation, the first network 106 and second network 112 may be a wireless network, a wired network or a combination thereof. The first network 106 and the second network 112 can be implemented as one of the different types of networks, such as intranet, local area network (LAN), wide area network (WAN), the Internet, and the like. The first network 106 and second network 112 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the first network 106 and second network 112 may include a variety of network devices, including routers, bridges, servers, computing devices, storage devices, and the like. The platform 102 may further be configured to perform data analysis and visualization using the data received from one or more systems from the set of systems 110. The working of the platform 102 for recommending Visual and Execution Templates to enable automation of control and data exploration across multiple systems is further explained with reference to FIG. 2.

Figure 2:
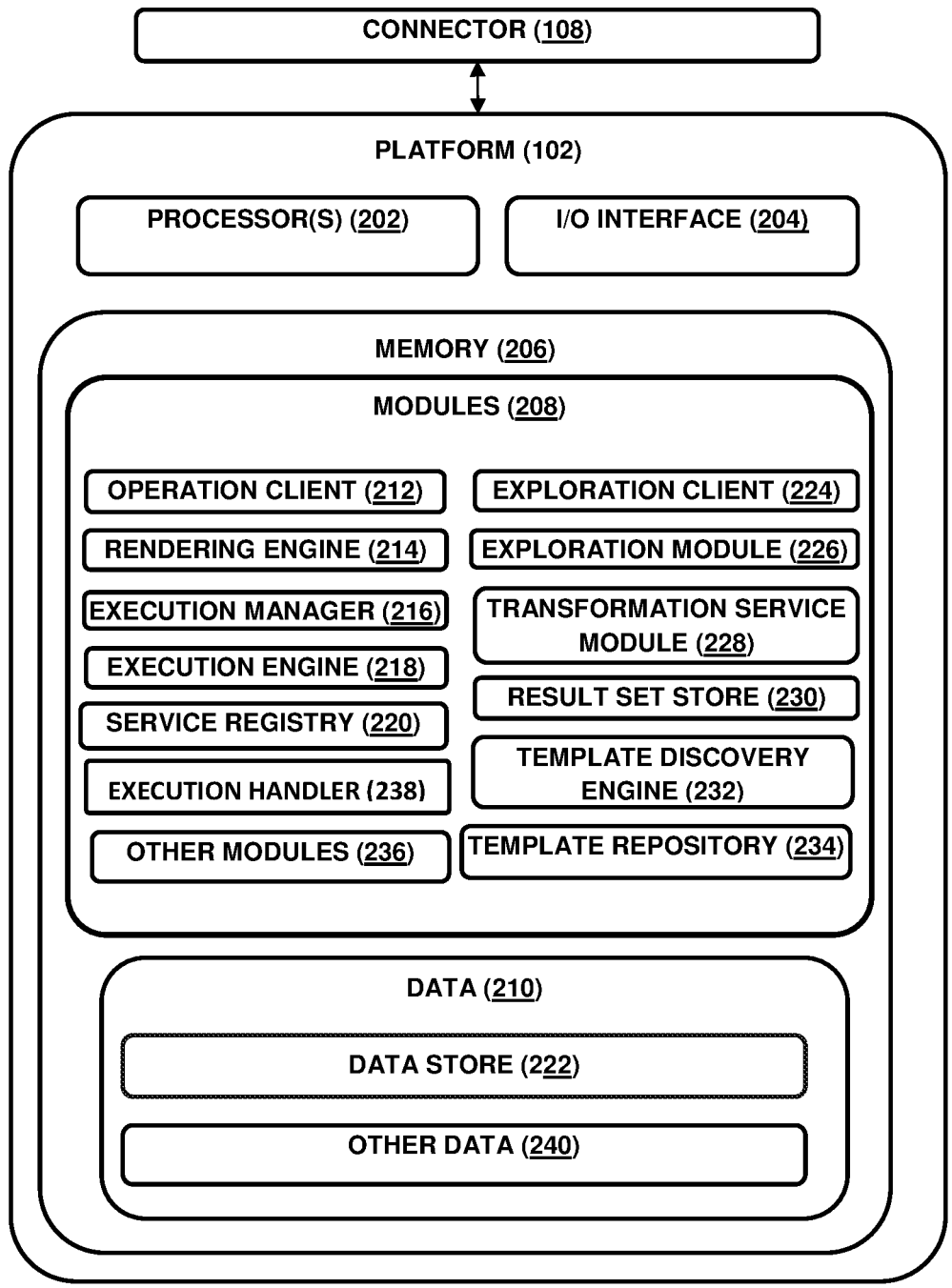
FIG. 2 illustrates the platform, in accordance with an embodiment of the present disclosure.

Referring now to FIG. 2, the platform 102 is illustrated in accordance with an embodiment of the present disclosure. In one embodiment, the platform 102 may be implemented using at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the platform 102 to interact with a user directly or through the client devices 104. Further, the I/O interface 204 may enable the platform 102 to communicate with other computing devices, such as web servers and external data servers and the set of systems 110. The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types.

In one implementation, the modules 208 may include an Operation Client 212, a Rendering Engine 214, an Execution manager 216, an Execution Engine 218, a Service Repository 220, a Data Store 222, an Exploration Client 224, an Exploration Module 226, a Transformation Service Module 228, a Result-set Store 230, a Template Discovery Engine 232, a Template Repository 234, and other modules 236. The other modules 236 may include programs or coded instructions that supplement applications and functions of the platform 102.

The data 210, amongst other things, serves as a repository for storing data processed, received, and generated by one or more of the modules 208. The data 210 may also include a data store 222, and other data 240. In one embodiment, the data store 222 may be configured to store data generated by the set of external systems and databases 110. In one embodiment, the Data Store 222 may be configured to store data generated by one or more modules 208. In one embodiment, the other data 240 may include data generated as a result of the execution of one or more modules in the modules 208. In one embodiment, the other data 240 may include data generated as a result of the execution of one or more modules in the other modules 236.

In one implementation, the platform may be configured to connect with a set of external systems and databases 110 through the second network 112. The user may register using the I/O interface 204 in order to use the platform 102. Once the user is registered, the user may use the client device 104 to access the platform 102 via the I/O interface 204. Once the user registers and is connected to the platform, the user may access different modules implemented over the platform and perform one or more operations and formulas.

Initially, the Graphical User Interface (GUI) over the user device 104 may enable the user to communicate with the platform 102 using the I/O interface 204. The I/O interface 204 may enable the user to create a new exploration or open an existing/saved exploration. The new exploration may correspond to a new folder, an old folder, an existing file, or a new file, a web browser, an analytics report and the like. In one embodiment, the existing/saved exploration may also correspond analytics operations/new analytics operation initiated by a user over the web browser or an offline tool.

The user may interact with the platform 102 through the GUI and select an element in the new exploration or the existing/saved exploration. The element may correspond to a graph, text, text box, command button, background, or any other visual element present on the existing/saved exploration. In one embodiment, context information associated with the user is determined based on the element selected by the user or inputs provided by the user.

The operation client 214 is configured to receive the context information. The context information is determined based on a visual element selected, by the user, in the exploration or inputs provided by the user. The user may provide inputs by entering a keyword in the exploration.

The service registry 220 may be configured to discover the set of operations associated with each system from the set of external systems and databases 110 based on context information to identify a subset of systems and a subset of operations based on the context information. The subset of operations may comprise individual operations and/or composite operations. In one embodiment, a composite operation may be a group of operations that may contain one or more operations provided by the target systems.

The GUI may render a menu on the user device 204. The menu may comprise the subset of operations. In one embodiment, the menu may be displayed in the form of a dropdown with subset of operations for the selection of the user.

The user may choose a target operation from the subset of operations displayed in the menu. In one embodiment, the user may choose more than one operation/composite operations from the subset of operations displayed in the menu as the target operation.

Once the target operation is selected, the operation client 212 is configured to handle the target operation selected by the user and transmit a request to the execution manager 216 to execute the target operation.

The execution manager 216 is configured to generate an execution plan for the target operation. The execution plan may represent a sequence in which the target operation should be executed and the information required for execution of the target operation. Execution plan is a graph of operations and formulas, wherein each node of the graph represents an operation to be executed on the target system.

The execution plan may be executed by the execution engine 218, by sending operation and its context based parameters to the connector 108 of the target system. While executing the execution plan, execution engine 218 may send the target operation to the target systems in parallel (i.e. concurrently) or sequentially (i.e. one after the other).

The target system may be configured to determine if the operation parameters received from the execution engine 218 is sufficient to execute the target operation.

If the operation parameters received from the execution engine 218 is not sufficient for execution of the target operation, the target system may be configured to generate the form's meta information. The form's meta information is sent to execution engine 218. The form's meta information may enable generation of a form to accept user inputs for the missing parameters of target operations or information related to the target operations.

The execution engine 218 may use the form's meta information to create a form node. The form node is exploration compatible (i.e. the form node may be placed and rendered in an exploration). Once the form node is generated, the form node is sent to the exploration module 226. The exploration module 226 is configured to add the exploration node to the current exploration associated with a new exploration or the existing/saved exploration.

The rendering engine 214 is configured to receive change event from exploration module 226. Further, the rendering engine 214 may be configured to send instructions to the user device 104 to render a user input form over the GUI. The user input form is generated based on the meta information.

The GUI 204 is configured to render the user input form. Further, the user may fill up all the necessary fields in the user input form and clicks on a command button from a set of command buttons. Each command button may be associated with different system from the set of systems or different operation associated with the target systems.

If the clicked command button is associated with another operation of any target system, then the execution is once again transferred to the operation client 212 to handle the another operation in the same way as the target operation.

If the clicked command button is not associated with another operation of the different system, Operation Client 212 is configured to gather user inputs received from the user input form and transfer these user inputs to the execution engine 218. The user inputs may be in the form of threshold parameters, predefined criteria's, or any other information generally used for analysis purpose.

The execution engine 218 is configured to transmit the user inputs received from the user to the target system through the connector 108.

If the information/user inputs received from the execution engine 218 are sufficient, the target system may be configured to execute the target operation. Based on the execution of the target operation, the target system may or may not generate new data.

If new data is generated, the execution engine 218 is configured to receive the type of the new data generated by the target systems. Execution engine 218 is configured to request Execution Handler 238 to determine the destination data container. For example, the type of new data may be structure data, unstructured data, analytics data, visual data and the like.

The Execution Handler 238 is configured to define the destination data container for the new data. Execution Handler 238 may be configured to find a data container of data store 222 where this data can be added/replaced, based on exploration chain or user configuration. If an existing data container has been identified to be reused, then the existing data container is assigned as the destination data container. In another embodiment, the Execution Handler 238 is configured to send a request to Data Store 222 to create a new empty data container for this type of data. The newly created data container becomes the destination data container.

The Execution Handler 238 is configured to send a request to the target system 110 with the identity of the destination data container of data store 222. The target system is configured to route the new data to the destination container of the data store 222. The Data store 222 is configured to store the data provided by the target systems. Connector 108 is configured to publish an event that the data has been changed in the destination container so that all the subscribers/listeners of this data change event can act accordingly. In one embodiment, a module may be configured to identify these events and accordingly create variety of visualizations on the GUI using the newly generated data. In another embodiment, the event may be identified by comparing the magnitude of change in the destination container with a predefined threshold change stored in the data store 222. It is to be noted that the connector 108 may be configured to notify one or more external systems and databases 110 associated to the event. Furthermore, the module may be configured to generate new data by calculating formulas based on the currently generated data or earlier generated data. Furthermore, the module may be configured to execute a chain of operations to update the dependent chain of operations on this change event. The chain of operations and formulas are executed during or after execution of the target operation.

In one embodiment, if the new data is generated in response to user selected operation/operation-group, then the execution engine 218 is configured to receive the type of the new data generated by the target systems. Execution engine 218 is configured to request Execution Handler 238 to determine the destination data container.

Further, the Execution Handler 238 is configured to determine if any existing data container can be reused to append or replace the newly generated data. Execution handler 238 may be configured to determine this based on exploration chain, user's choice, or configuration and the like. If an existing data container cannot be reused, then Execution Handler 238 requests the Template Discovery Engine 232 to search for best fit templates for the received data set type.

Further, the Template Discover Engine 232 is configured to Query the Template Repository 234 to identify all the best fit templates suitable for representing the 'type of data' associated with the new data. In one embodiment, a subset of best fit templates is discovered by the execution handler from a set of saved templates or templates generated in real-time based on the type of data received from the target system and a set of predefined rules. The subset of best fit templates enables transmitting data to the target system, write back to the target system in order to control the target system and receiving data from target system for data visualization and analysis.

In one embodiment, the Template Repository 234 is configured to analyse a set of templates, saved in the Template Repository 234, based on either the 'type of data', 'user inputs', 'environment variables' alone or in combination to discover a subset of matching templates/best fit templates applicable for the current user. In one embodiment, the set of templates may comprise:

Templates created by the user
Templates published to the user by other users
Templates recommended by the system for the user (on the basis of past behaviour of users or other system parameters). In other words, the template repository is configured to maintain the set of saved templates. The set of saved templates comprise of one or more templates created by the user, one or more templates published by other users of the platform, and one or more system generated templates. The system generated templates are generated based on analysis of explicit feedback provided by user or templates generated based on the set of predefined rules. The set of predefined rules comprise implicit feedback captured from users' behavior, wherein the users' behavior is derived from users' usage patterns, time spent by user with certain visualizations or data, and computations performed by user on the data. The set of predefined rules may also comprise a set of parameters including, but not limited to, User's default template, Most frequently used by the user/team/organization, Longevity of usage, Most recently used by the user, Most relevant based on User's usage history, location, role, and Type and structure of the data received from target system. In one implementation, the set of predefined rules may be generated by using machine learning techniques on the implicit feedback captured from users' behavior and the set of parameters.

Further, execution handler 238 is configured to receive the set of matching templates/best fit templates and default visualizations corresponding to the type of data, user inputs, environment variables or a combination thereof. Further, execution handler is configured to send a request to Exploration module 226 to add these templates in the current exploration. Further, the execution handler 238 is configured to rank the subset of best fit templates from the set of saved templates or templates generated in real-time based on predefined criteria's, wherein the predefined criteria's comprise best outcomes, popularity, relevance, creators, type of exploration or expected execution time, and wherein the real-time templates are generated using AI and Machine learning The Exploration module 226 is configured to add the received templates and default visualizations to a view panel or exploration pages for the purpose of execution of templates on the GUI. In one embodiment, the templates may be added to the exploration pages on the basis of meta attributes of the template like confidence score, popularity, relevance, expected time of execution etc. The user may view the set of matching templates and various visualizations on the view panel. The process of controlling one or more systems and exploring data across the one or more systems connected to the platform is further elaborated with respect to the block diagram of FIG. 3.

Figure 3:
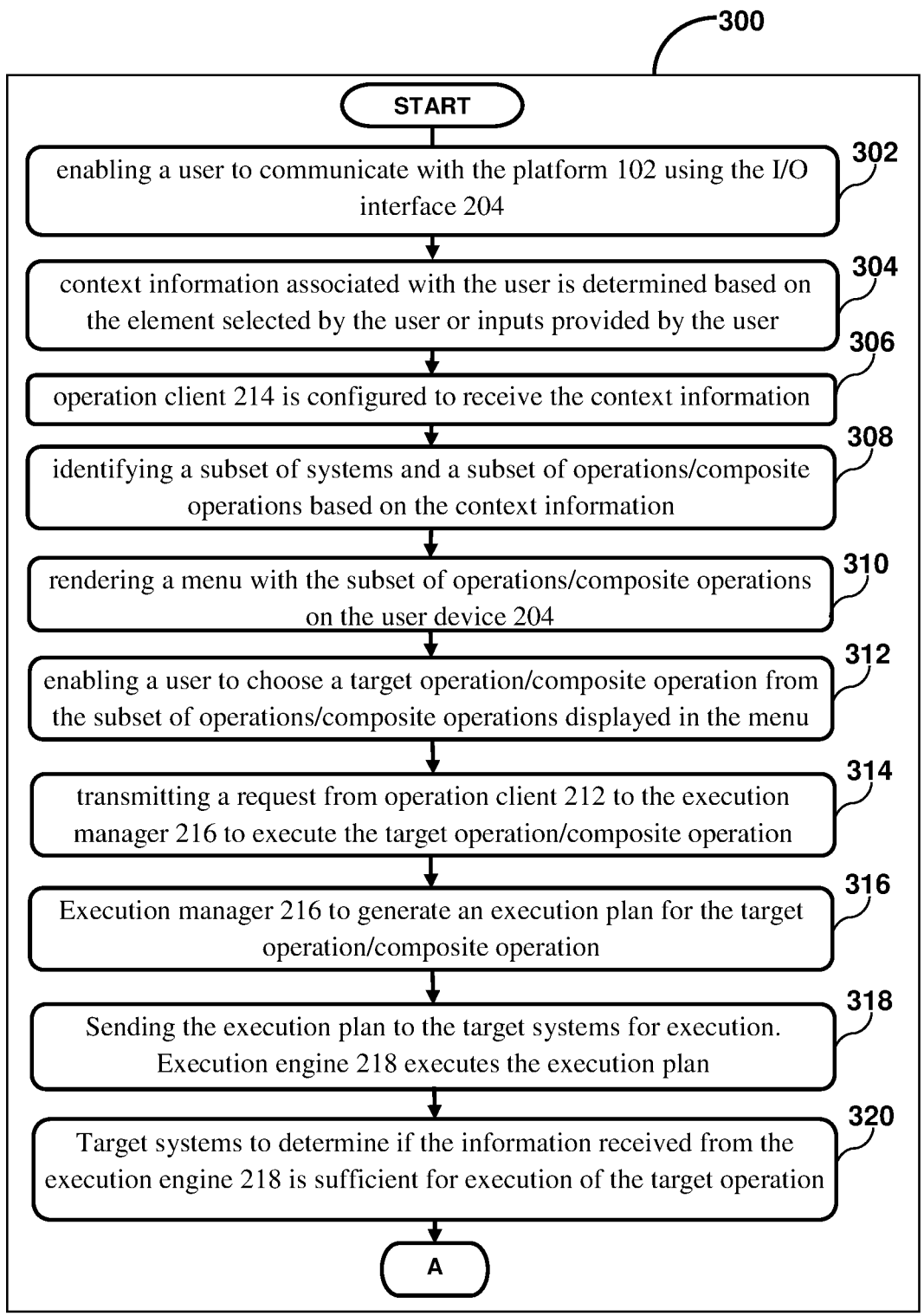
FIG. 3 illustrates a block diagram for controlling one or more systems and exploring data across the one or more system connected to the platform, in accordance with an embodiment of the present disclosure.

Referring now to FIG. 3, a method 300 for controlling one or more systems and exploring data across the one or more systems connected to the platform 102 is illustrated, in accordance with an embodiment of the present disclosure. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described platform 102.

In one embodiment, at step 302, the Graphical User Interface (GUI) over the user device 104 may enable the user to communicate with the platform 102 using the I/O interface 204. The I/O interface 204 may enable the user to create a new exploration or open an existing/saved exploration. The new exploration may correspond to a new folder, an old folder, an existing file, or a new file, a web browser, an analytics report and the like. In one embodiment, the existing/saved exploration may also correspond analytics operations/new analytics operation initiated by a user over the web browser or an offline tool.

At step 304, the user may interact with the platform 102 through the GUI and select an element in the new exploration or the existing/saved exploration. The element may correspond to a graph, text, text box, command button, background, or any other visual element present on the existing/saved exploration. In one embodiment, context information associated with the user is determined based on the element selected by the user or inputs provided by the user.

At step 306, the operation client 214 is configured to receive the context information. The context information is determined based on a visual element selected, by the user, in the exploration or inputs provided by the user. The user may provide inputs by entering a keyword in the exploration.

At step 308, the service registry 220 may be configured to discover the set of operations associated with each system from the set of external systems and databases 110 based on context information to identify a subset of systems and a subset of operations based on the context information. The subset of operations may comprise individual operations and/or composite operations. In one embodiment, a composite operation may be a group of operations that may contain one or more operations provided by the target systems.

At step 310, the GUI may render a menu on the user device 204. The menu may comprise the subset of operations. In one embodiment, the menu may be displayed in the dorm of a dropdown with subset of operations for the selection of the user.

At step 312, the user may choose a target operation from the subset of operations displayed in the menu. In one embodiment, the user may choose more than one operation/composite operations from the subset of operations displayed in the menu as the target operation.

At step 314, once the target operation is selected, the operation client 212 is configured to handle the target operation selected by the user and transmit a request to the execution manager 216 to execute the target operation.

At step 316, the execution manager 216 is configured to generate an execution plan for the target operation. The execution plan may represent a sequence in which the target operation should be executed and the information required for execution of the target operation. Execution plan is a graph of operations and formulas, wherein each node of the graph represents an operation to be executed on the target system.

At step 318, the execution plan may be executed by the execution engine 218, by sending operation and its context based parameters to the connector of the target system. While executing the execution plan, execution engine 218 may send the target operation to the target systems in parallel (i.e. concurrently) or sequentially (i.e. one after the other).

At step 320, the target system may be configured to determine if the operation parameters received from the execution engine 218 is sufficient to execute the target operation.

At step 322, if the operation parameters received from the execution engine 218 is not sufficient for execution of the target operation, the target system may be configured to generate the form's meta information. The form's meta information is sent to execution engine 218. The form's meta information may enable generation of a form to accept user inputs for the missing parameters of target operations or information related to the target operations.

At step 324, the execution engine 218 may use the form's meta information to create a form node. The form node is exploration compatible (i.e. the form node may be placed and rendered in an exploration). Once the form node is generated, the form node is sent to the exploration module 226. The exploration module 226 is configured to add the exploration node to the current exploration associated with a new exploration or the existing/saved exploration.

At step 326, rendering engine 214 is configured to receive change event from exploration module 226. Further, the rendering engine 214 may be configured to send instructions to the user device 104 to render a user input form over the GUI. The user input form is generated based on the meta information.

At step 328, the GUI 204 is configured to render the user input form. Further, the user may fill up all the necessary fields in the user input form and clicks on a command button from a set of command buttons. Each command button may be associated with different system from the set of systems or different operation associated with the target system.

At step 330, if the clicked command button is associated with another operation of any target system, then the execution is once again transferred to step 314.

At step 332, if the clicked command button is not associated with another operation of the different system, Operation Client 212 is configured to gather user inputs received from the user input form and transfer these user inputs to the execution engine 218. The user inputs may be in the form of threshold parameters, predefined criteria's, or any other information generally used for analysis purpose.

At step 334, the execution engine 218 is configured to transmit the user inputs received from the user to the target system through the connector 108.

At step 336, if the information/user inputs received from the execution engine 218 are sufficient, the target system may be configured to execute the target operation. Based on the execution of the target operation, the target system may or may not generate new data.

At step 338, if new data is generated, the execution engine 218 is configured to receive the type of the new data generated by the target systems. Execution engine 218 is configured to request Execution Handler 238 to determine the destination data container. For example, the type of new data may be structure data, unstructured data, analytics data, visual data and the like.

At step 340, the Execution Handler 238 is configured to define the destination data container for the new data. Execution Handler 238 may be configured to find a data container of data store 222 where this data can be added/replaced, based on exploration chain or user configuration. If an existing data container has been identified to be reused, then the existing data container is assigned as the destination data container. In another embodiment, the Execution Handler 238 is configured to send a request to Data Store 222 to create a new empty data container for this type of data. The newly created data container becomes the destination data container.

At step 342, the Execution Handler 238 is configured to send a request to the target system 110 with the identity of the destination data container of data store 222. The target system is configured to route the new data to the destination container of the data store 222. Data store 222 is configured to store the data provided by the target systems 110. Data store 222 is configured to publish an event that the data has been changed in the destination container so that all the subscribers/listeners of this data change event can act accordingly. In one embodiment, a module may be configured to identify these events and accordingly create variety of visualizations on the GUI using the newly generated data. In another embodiment, the event may be identified by comparing the magnitude of change in the destination container with a predefined threshold change stored in the data store 222. It is to be noted that the connector 108 may be configured to notify one or more external systems and databases 110 associated to the event. Further, the module may be configured to generate new data by calculating formulas based on the currently generated data or earlier generated data. Furthermore, the module may be configured to execute a chain of operations to update the dependent chain of operations on this change event. The chain of operations and formulas are executed during or after execution of the target operation. The process of recommending Visual and Execution Templates to enable automation of control and data exploration across multiple systems is further elaborated with reference to block diagram of FIG. 4.

Figure 4:
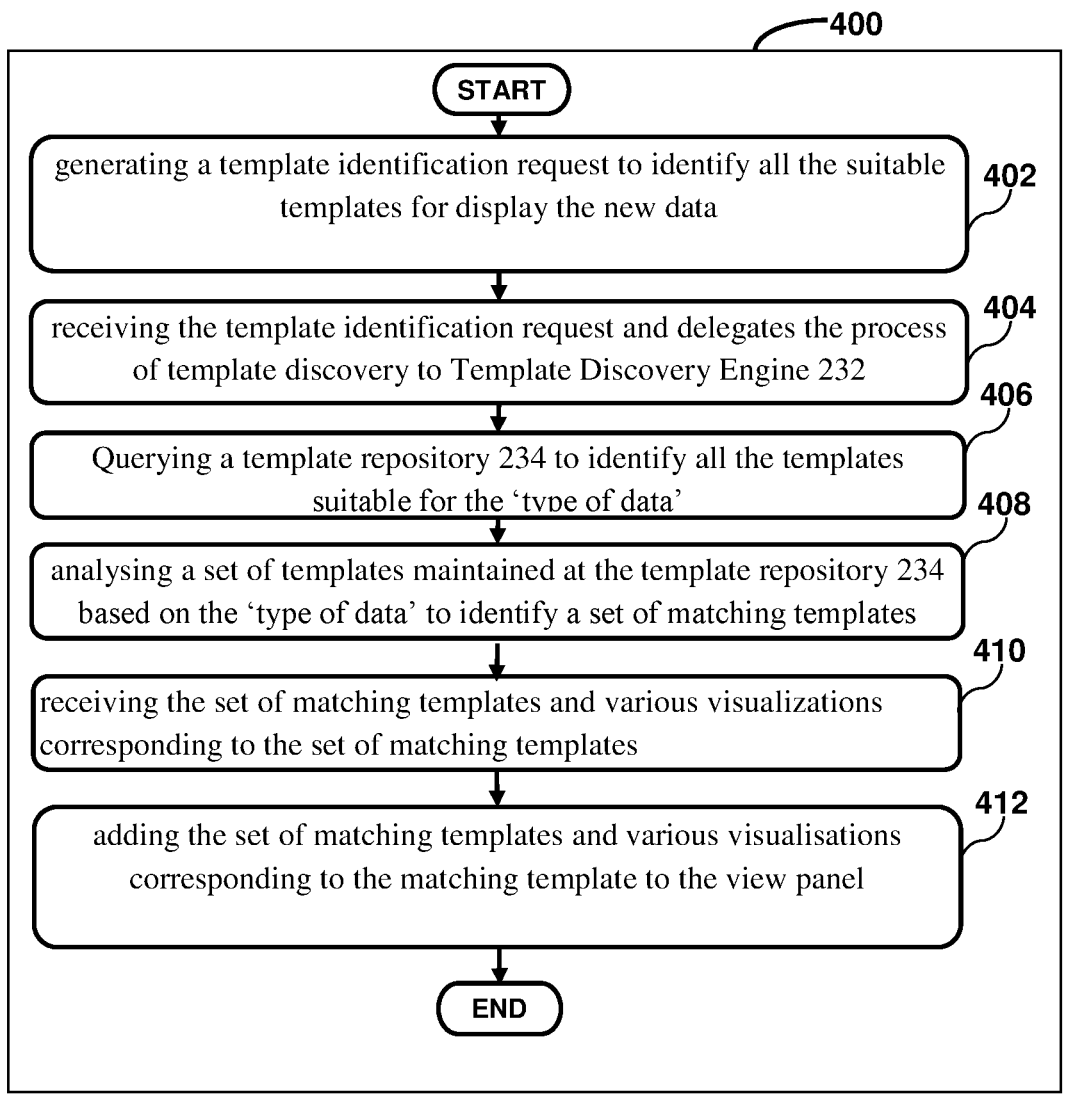
FIG. 4 illustrates a block diagram for recommending Visual and Execution Templates to enable automation of control and data exploration across multiple systems, in accordance with an embodiment of the present disclosure.

Referring now to FIG. 4, a method 400 for recommending Visual and Execution Templates to enable automation of control and data exploration across multiple systems is illustrated, in accordance with an embodiment of the present disclosure. The method 400 may be described in the general context of computer executable instructions. Generally, computer executable instructions can include routines, programs, objects, components, data structures, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method can be implemented in any suitable hardware, software, firmware, or combination thereof. However, for ease of explanation, in the embodiments described below, the method 400 may be considered to be implemented in the above described platform 102.

At step 402, if the new data is generated in response to user selected operation/operation-group, then the execution engine 218 is configured to receive the type of the new data generated by the target systems. Execution engine 218 is configured to request Execution Handler 238 to determine the destination data container.

At step 404, the Execution Handler 238 is configured to determine if any existing data container can be reused to append or replace the newly generated data. Execution handler 238 may be configured to determine this based on exploration chain, user's choice, or configuration and the like. If an existing data container cannot be reused, then Execution Handler 238 requests the Template Discovery Engine 232 to search for best fit templates for the received data set type.

At step 406, the Template Discover Engine 232 is configured to Query the Template Repository 234 to identify all the best fit templates suitable for representing the 'type of data' associated with the new data. In one embodiment, a subset of best fit templates is discovered by the execution handler from a set of saved templates or templates generated in real-time based on the type of data received from the target system and a set of predefined rules. The subset of best fit templates enables transmitting data to the target system, write back to the target system in order to control the target system and receiving data from target system for data visualization and analysis.

At step 408, the Template Repository 234 is configured to analyse a set of templates, saved in the Template Repository 234, based on either the 'type of data', 'user inputs', 'environment variables' alone or in combination to discover a set of matching templates/best fit templates applicable for the current user. In one embodiment, the set of templates may comprise:

Templates created by the user
Templates published to the user by other users
Templates recommended by the system for the user (on the basis of past behaviour of users or other system parameters). In other words, the template repository is configured to maintain the set of saved templates. The set of saved templates comprise of one or more templates created by the user, one or more templates published by other users of the platform, and one or more system generated templates. The system generated templates are generated based on analysis of explicit feedback provided by user or templates generated based on the set of predefined rules. The set of predefined rules comprise implicit feedback captured from users' behavior, wherein the users' behavior is derived from users' usage patterns, time spent by user with certain visualizations or data, and computations performed by user on the data. The set of predefined rules may also comprise a set of parameters including, but not limited to, User's default template, Most frequently used by the user/team/organization, Longevity of usage, Most recently used by the user, Most relevant based on User's usage history, location, role, and Type and structure of the data received from target system. In one implementation, the set of predefined rules may be generated by using machine learning techniques on the implicit feedback captured from users' behavior and the set of parameters.

At step 410, the Execution handler 238 is configured to receive the set of matching templates/best fit templates and default visualizations corresponding to the type of data, user inputs, environment variables or a combination thereof. Further, execution handler is configured to send a request to Exploration module 226 to add these templates in the current exploration. Further, the execution handler 238 is configured to rank the subset of best fit templates from the set of saved templates or templates generated in real-time based on predefined criteria's, wherein the predefined criteria's comprise best outcomes, popularity, relevance, creators, type of exploration or expected execution time, and wherein the real-time templates are generated using AI and Machine learning.

At step 412, the Exploration module 226 is configured to add the received templates and default visualizations to a view panel or exploration pages for the purpose of execution of templates on the GUI. In one embodiment, the templates may be added to the exploration pages on the basis of meta attributes of the template like confidence score, popularity, relevance, expected time of execution etc. The user may view the set of matching templates and various visualisations on the view panel.

Although implementations for methods and systems for recommending Visual and Execution templates to automate exploration across one or more disparate systems have been described, it is to be understood that the appended claims are not necessarily limited to the specific features or methods described. Rather, the specific features and methods are disclosed as examples of implementations for recommending Visual and Execution templates to automate exploration across one or more disparate systems.

The invention claimed is:

1. A platform for recommending visual and execution templates to enable automation of control and data exploration across multiple systems, wherein the platform comprises:
a memory; and
a processor coupled to the memory, wherein the processor is configured to execute program instructions, associated with one or more modules, stored in the memory for:
establishing connection with a set of external systems and databases;
rendering a new exploration or render an existing exploration over a graphical user interface based on user inputs;

identifying a sub-set of systems from the set of external systems and databases based on a context information;

displaying a set of operations/operation-groups associated with the sub-set of systems based on the context information;

identifying a target system associated with a target operation/operation-group selected by the user;

transmitting the target operation/operation-group execution request to the target system, wherein the target operation/operation-group is associated with one of a read operation, a write operation to control the target system, capture user inputs and perform one of read and write operation to control the target system based on the user inputs;

receiving data from the target system, wherein the data is received in response to execution of the operation or operation-group over the target system; and discovering a subset of best fit templates, from a set of saved templates or templates generated in real-time, based on the type of data received from the target system and a set of predefined rules, wherein the subset of best fit templates enables transmitting data to the target system to write back to the target system in order to control the target system and receiving data from target system for data visualization.

2. The platform of claim 1, wherein the set of systems are registered over a service registry.

3. The platform of claim 1, wherein the context information is determined based on a visual element selected, by the user, in the exploration or inputs provided by the user.

4. The platform of claim 1, wherein the Graphical User Interface is configured to render a menu on a user device, wherein the menu comprises the subset of operations.

5. The platform of claim 1, further configured to generate an execution plan for the target operation, wherein the execution plan is a graph of operations, wherein each node of the graph represents an operation to be executed on the target system.

6. The platform of claim 5, wherein the target system is configured to generate a form's meta information to enable generation of a form to accept user inputs for missing piece of information, when the information received from the execution engine is not sufficient for execution of the target operation.

7. The platform of claim 6, wherein the form's meta information is used to create a form node, wherein the form node is exploration compatible, wherein an exploration node corresponding to the form node is added to the current exploration associated with a new exploration or the existing/saved exploration.

8. The platform of claim 7, wherein the target system is configured to send instructions to the user device to render a user input form over the GUI, wherein the user input form is generated based on the form's meta information, wherein the user input form is generated upon receiving a change event.

9. The platform of claim 8, wherein user inputs received from the user input form are analysed and execution is transferred to the target system, when the user inputs on the user input form corresponds to an operation associated with the target system, and wherein the execution is transferred to other system when the user inputs on the user input form corresponds to an operation associated with the other system.

10. The platform of claim 9, wherein the target system is configured to execute the target operation when the information/user inputs received from the user are sufficient.

11. The platform of claim 10, further configured to receive the type of the new data generated by the target system and determine the destination data container, when new data is generated upon execution of the target operation.

12. The platform of claim 11, further configured to:
define the destination data container for the new data, or identify a data container of data store where this data can be added or replaced, based on exploration chain or user configuration, when an existing data container is identified to be reused, then the existing data container is assigned as the destination data container.

13. The platform of claim 12, further configured to send a request to the target system with the identity of the destination data container of data store, and wherein the target system is configured to route the new data to the destination container of the data store, wherein the data store is configured to store the new data provided by the target system, and publish a change event corresponding to change in the destination container.

14. The platform of claim 10, further configured to execute a chain of operations on the target system based on execution of the target operation, wherein the chain of operations is executed during or after execution of the target operation.

15. The platform of claim 1, further comprising steps for ranking the set of best fit templates from the set of saved templates or templates generated in real-time based on predefined criteria's, wherein the predefined criteria's comprise best outcomes, popularity, relevance, creators, type of exploration or expected execution time, and wherein the real-time templates are generated using AI and Machine learning.

16. The platform of claim 1, wherein the template repository is configured to maintain the set of saved templates, wherein the set of saved templates comprise of one or more templates created by the user, one or more templates published by other users of the platform, and one or more system generated templates.

17. The platform of claim 1, wherein:
the system generated templates are generated based on analysis of explicit feedback provided by user, and
the system generated templates are templates generated based on the set of predefined rules, wherein the set of predefined rules comprise implicit feedback captured from users' behavior, wherein the users' behavior is derived from users' usage patterns, time spent by user with certain visualizations or data, and computations performed by user on the data.

18. The platform of claim 1, wherein the set of predefined rules comprise User's default template, Most frequently used by the user/team/organization, Longevity of usage, Most recently used by the user, Most relevant based on User's usage history, location, role, Type and structure of the data received from target system.

19. A method for recommending visual and execution templates to enable automation of control and data exploration across multiple systems, wherein the method comprises steps for:
establishing, by a processor, connection with a set of external systems and databases;
rendering, by the processor, a new exploration or render an existing exploration over a graphical user interface based on user inputs;

identifying, by the processor, a sub-set of systems from the set of external systems and databases based on a context information;

displaying, by the processor, a set of operations/operation-groups associated with the sub-set of systems based on the context information;

identifying, by the processor, a target system associated with a target operation/operation-group selected by the user;

transmitting, by the processor, the target operation/operation-group execution request to the target system, wherein the target operation/operation-group is associated with one of a read operation, a write operation to control the target system, capture user inputs and perform one of read and write operation to control the target system based on the user inputs;

receiving, by the processor, data from the target system, wherein the data is received in response to execution of the operation or operation-group over the target system; and discovering, by the processor, a subset of best fit templates, from a set of saved templates or templates generated in real-time, based on the type of data received from the target system and a set of predefined rules, wherein the subset of best fit templates enables transmitting data to the target system to write back to the target system and receiving data from target system for data visualization.

20. A computer program product having embodied thereon a computer program for recommending visual and execution templates to enable automation of control and data exploration across multiple systems, the computer program product comprising:

a program code for establishing connection with a set of external systems and databases;

a program code for rendering a new exploration or render an existing exploration over a graphical user interface based on user inputs;

a program code for identifying a sub-set of systems from the set of external systems and databases based on a context information;

a program code for displaying a set of operations/operation-groups associated with the sub-set of systems based on the context information;

a program code for identifying a target system associated with a target operation/operation-group selected by the user;

a program code for transmitting the target operation/operation-group execution request to the target system, wherein the target operation/operation-group is associated with one of a read operation, a write operation, capture user inputs and perform one of read and write operation based on the user inputs;

a program code for receiving data from the target system, wherein the data is received in response to execution of the operation or operation-group over the target system; and a program code for discovering a set of best fit templates, from a subset of saved templates or templates generated in real-time, based on the type of data received from the target system and a set of predefined rules, wherein the subset of best fit templates enables transmitting data to the target system to write back to the target system and receiving data from target system for data visualization.

* * * * *